United States Patent [19]

Shimizu

[11] Patent Number: 4,766,970

[45] Date of Patent: Aug. 30, 1988

[54] MOTOR-OPERATED POWER STEERING APPARATUS WITH RACK AND PINION MECHANISM

[75] Inventor: Yasuo Shimizu, Saitama, Japan

[73] Assignee: Honda Giken Kogyo Kabushiki Kaisha, Tokyo, Japan

[21] Appl. No.: 105,556

[22] Filed: Oct. 6, 1987

[30] Foreign Application Priority Data

Oct. 9, 1986 [JP] Japan .................. 61-155263[U]

[51] Int. Cl.$^4$ .............................................. B62D 5/04
[52] U.S. Cl. .................................................. 180/79.1
[58] Field of Search ............................... 180/79.1, 148; 74/388 PS, 498

[56] References Cited

U.S. PATENT DOCUMENTS 4,415,054 11/1983 Drutchas ............................ 180/79.1
4,593,781 6/1986 Galtier ................................ 180/79.1

FOREIGN PATENT DOCUMENTS 59-50864 3/1984 Japan .
2146300 4/1985 United Kingdom ............... 180/79.1

Primary Examiner—John A. Pekar
Attorney, Agent, or Firm—Rosen, Dainow & Jacobs

[57] ABSTRACT

A motor-operated power steering apparatus includes a pinion shaft having a pinion, a rack shaft having a rack meshing with the pinion, a gear casing having first and second spaces therein, the pinion shaft being rotatably supported in the gear casing, the rack shaft being axially movably supported in the gear casing, an electric motor for generating assistive power, an assistive-power transmitting mechanism disposed in the gear casing for transmitting power of the electric motor to the rack shaft, and a partition member disposed between the first space in which the rack is disposed and the second space in which the assistive-power transmitting mechanism is disposed, and isolating the first and second spaces from each other for preventing dust and water from entering the assistive-power transmitting mechanism from outside. The rack shaft and the gear casing are of reduced lengths to make the power steering apparatus small in size and lightweight.

9 Claims, 3 Drawing Sheets

MOTOR-OPERATED POWER STEERING APPARATUS WITH RACK AND PINION MECHANISM

BACKGROUND OF THE INVENTION

1. Field of the Invention:

The present invention relates to a motor-operated power steering apparatus with a rack and pinion mechanism.

2. Description of the Relevant Art:

One motor-operated power steering apparatus wherein assistive steering power is generated by an electric motor and applied to a rack and pinion mechanism is disclosed in Japanese Laid-Open Patent Publication No. 59-50864 (corresponding U.S. Pat. No. 4,415,054). In the disclosed motor-operated power steering apparatus, rotative power produced by the motor which is disposed coaxially with a rack shaft is converted by a ball screw mechanism to a force in the axial direction of the rack shaft for assisting the steering torque imposed by a steering wheel to reduce steering efforts.

According to the earlier motor-operated power steering apparatus referred to above, as shown in FIGS. 3 and 5 of the accompanying drawings, seal members 13 are disposed respectively on the opposite ends of a gear casing 11 to seal the space in the gear casing 11 in which a gear mechanism 14 and a ball screw mechanism 15 are housed, so that the gear mechanism 14 and the ball screw mechanism 15 are resistant to dust and water. The gear mechanism 14 comprises rack teeth 14a and a pinion gear 14b in mesh therewith. The ball screw mechanism 15 comprises a helical groove 15a defined in a rack shaft 12 and a plurality of balls (not shown) rollingly riding in the helical groove 15a.

The seal members 13 on the opposite ends of the gear casing 11 are held in sliding contact with the peripheral surface of the rack shaft 12. Therefore, the rack shaft 12 must have opposite end portions each having an axial dimension L for sliding engagement with one of the seal members 13. Accordingly, the rack shaft 12 and the gear casing 11 are long and, as a result, the power steering apparatus is heavy.

More specifically, in order to prevent the rack teeth 14a and the helical groove 15a from contacting the seal members 13 or from projecting out of the gear casing 11 when the rack shaft 12 is axially moved a maximum distance L/2 from the neutral position thereof (i.e., the neutral position of the steering wheel), each end portion of the rack shaft 12 must be L/2 long on each side of the seal member 13 at the time the rack shaft 12 is in the neutral position. For this reason, the rack shaft 12 and the gear casing 11 are long and heavy. L indicates the distance which the rack shaft 12 is moved axially when the steering wheel is turned from one maximum-steering-angle position to the other maximum-steering-angle position, i.e., from lock to lock.

SUMMARY OF THE INVENTION

In view of the aforesaid problems of the conventional motor-operated power steering apparatus described above, it is an object of the present invention to provide a motor-operated power steering apparatus which has an assistive power transmitting mechanism disposed in a securely sealed space to make the assistive power transmitting mechanism highly resistant to dust and water, which includes a rack shaft and a gear casing that have reduced lengths, thereby making the power steering apparatus small and light, and which provides a sufficient space around the rack shaft and the gear casing to allow steering linkages which interconnect the rack shaft and the wheels to be designed with increased freedom or flexibility.

According to the present invention, there is provided a rack-and-pinion-type motor-operated power steering apparatus including a pinion shaft having a pinion and adapted to be operatively coupled to a steering wheel, a rack shaft having a rack and adapted to be operatively coupled to wheels, a gear casing having first and second spaces therein, said pinion shaft being rotatably supported in said gear casing, said rack shaft being axially movably supported in said gear casing, said pinion and said rack being held in mesh with each other within said first space in said gear casing, an electric motor for generating assistive power, assistive-power transmitting means disposed in said second space around said rack shaft for converting rotative power of said electric motor to a force in an axial direction of said rack shaft and transmitting said force to said rack shaft, and partition means disposed between said first and second spaces and isolating them from each other.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 1:
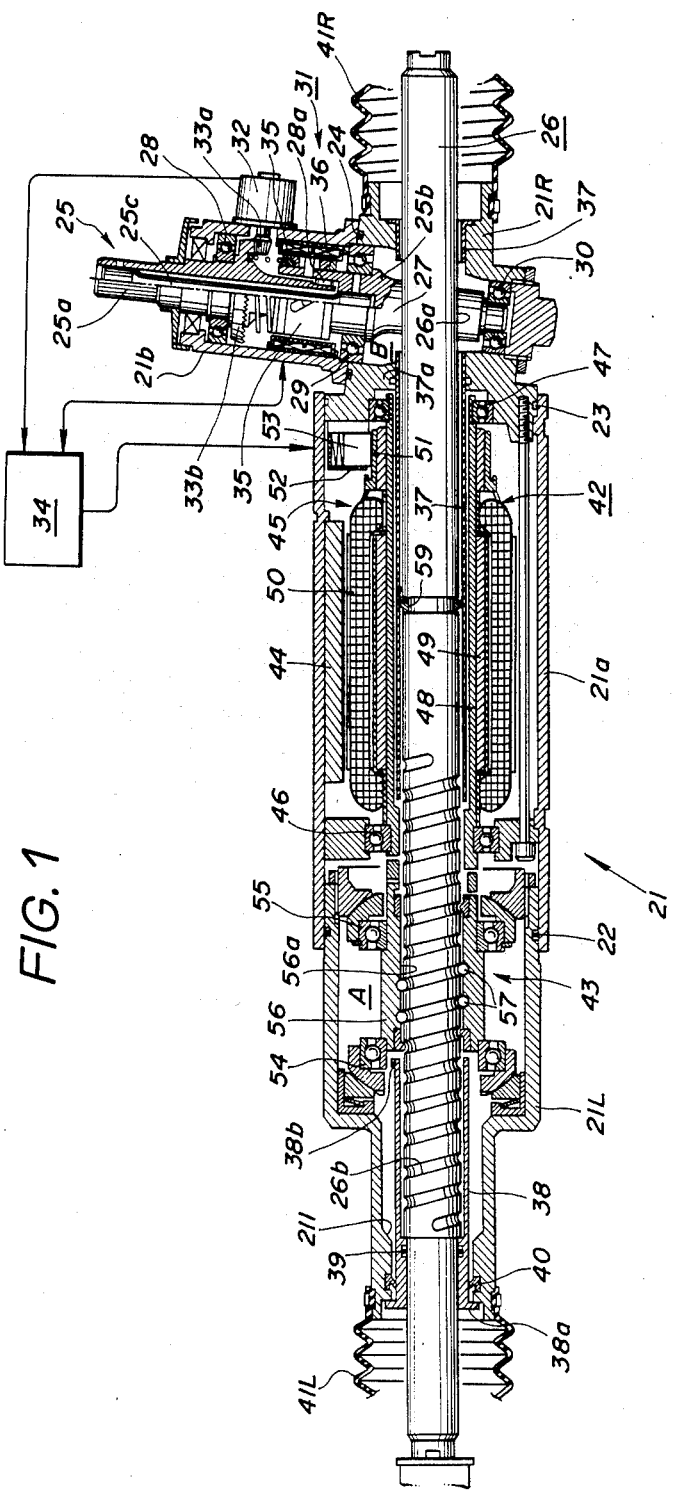
FIG. 1 is a longitudinal cross-sectional view of a motor-operated power steering apparatus with a rack and pinion mechanism according to the present invention.

As shown in FIG. 1, a motor-operated power steering apparatus includes a gear casing 21 comprising a cylindrical central case 21a, a pair of side cases 21L, 21R fitted respectively in the opposite ends of the central case 21a, and a pinion case 21b mounted on the side case 21R. The gear casing 21 is mounted on a vehicle body, not shown. The central case 21a, the side cases 21L, 21R, and the pinion case 21b have joined portions where seal members 22, 23, 24 are located. A pinion shaft 25 operatively coupled to a steering wheel (not shown) is rotatably supported in the gear casing 21. A rack shaft 26, operatively coupled at its opposite ends to respective wheels having inflated lines through steering linkages such as tie rods, is axially slidably supported in the gear casing 21. The rack shaft 26 has a rack or rack teeth 26a defined on its back which are held in mesh with a pinion 27 on the pinion shaft 25 within the side case 21R.

The pinion shaft 25 includes a first shaft member 25a, a second shaft member 25b, and a torsion bar 25c which interconnects the first and second shaft members 25a, 25b such that the first and second shaft members 25a, 25b can be turned about their own axes with respect to each other through a given angle. The pinion shaft 25 extends through the pinion case 25c and is rotatably supported in the pinion case 21b and the side case 21R by means of bearings 28, 29, 30.

A steering torque sensor 31 is disposed in the pinion case 21b around the pinion shaft 25, and a steering rotation sensor 32 is mounted on an outer wall surface of the pinion case 21b, the steering torque sensor 31 and the steering rotation sensor 32 being electrically connected to a control unit 34.

The steering rotation sensor 32 comprises an electric generator having a rotatable shaft on which there is fixedly mounted a bevel gear 33a meshing with a bevel gear 33b fixed to the pinion shaft 25. Therefore, in response to rotation of the pinion shaft 25, the shaft of the steering rotation sensor 32 is rotated and the steering rotation sensor 32 produces a steering rotation signal having a polarity dependent on the direction in which the pinion shaft 25 is rotated and a potential dependent on the speed of rotation of the pinion shaft 25. The produced steering rotation signal is applied to the control unit 34.

The steering torque sensor 31 has a movable iron core 35 fitted over the pinion shaft 25 and axially slidable in the vicinity of the region where the first and second shaft members 25a, 25b are joined to each other, and a differential transformer 36 fixed to an inner wall surface of the pinion case 21b for detecting axial displacement of the movable iron core 35. The movable iron core 35 has a cam groove for converting relative rotation of the first and second shaft members 25a, 25b to axial movement, and is axially displaceable in response to relative rotation between the first and second shaft members 25a, 26b, i.e., a steering torque. The differential transformer 36 is electrically connected to the control unit 34 for generating a steering torque signal representative of displacement of the movable iron core 35, i.e., the direction and magnitude of the applied steering torque.

Figure 2:
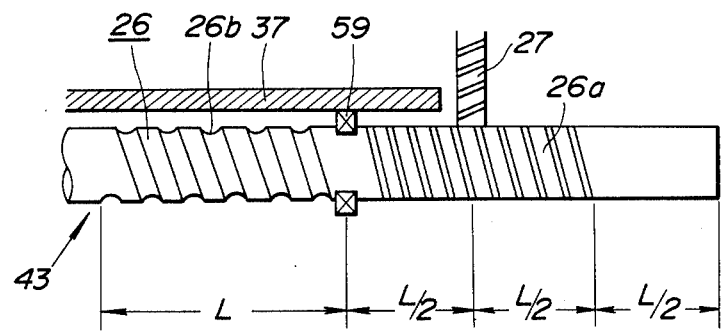
FIGS. 2 and 4 are schematic fragmentary views of the motor-operated power steering apparatus shown in FIG. 1.

As shown in FIG. 2, the rack teeth 26a on the rack shaft 26 are defined over an axial distance L, and the rack shaft 26 also has a helical groove 26b defined over the same axial distance L. The rack shaft 26 is axially slidably supported in the central case 21a and the side cases 21L, 21R.

An auxiliary tube 37 is supported by the side case 21R, shown on the righthand side of FIG. 1, in a cantilevered fashion, and is disposed coaxially with the rack shaft 26 with a small gap defined between the inner peripheral surface of the auxiliary tube 37 and the outer peripheral surface of the rack shaft 26. A seal member 37a is sealingly interposed between the auxiliary tube 37 and the side case 21R. A seal member 59 mounted on the rack shaft 26 is slidably held against the inner peripheral surface of the auxiliary tube 37. The seal member 59 serves to seal the gap between the auxiliary tube 37 and the rack shaft 26, and separate lefthand and righthand spaces A, B in the gear casing 21 from each other. The space A houses therein a ball screw mechanism 43 (described below), and the space B accommodates the rack teeth 26a therein. The auxiliary tube 37 has a window or recess defined therein at an area wherein the pinion 27 and the rack teeth 26a mesh with each other and the rack shaft 26 engages a rack guide (not shown).

The rack shaft 26 has a lefthand end portion inserted through a hollow protective tube 38 slidably supported in the side case 21L.

The protective tube 38 has a length which is substantially equal to half of the distance L that the rack shaft 26 is movable when the steering wheel is turned from lock to lock. The protective tube 38 has stoppers 38a, 38b respectively on its opposite ends. When the stopper 38a is engaged by the outer end of the side case 21L, the protective tube 38 has been inserted into the side case 21L by the maximum interval, i.e., the maximum inserted position of the protective tube 38 is established. When the stopper 38b is engaged by a reduced-inside-diameter portion 211 of the side case 21L, the protective tube 38 has projected out of the side case 21L by the maximum interval, i.e., the maximum projecting position of the protector tube 38 is established. When the rack shaft 26 is moved leftwardly, the protective tube 38 is moved therewith to project out of the gear casing 21. A seal member 39 is mounted on the protective tube 38 in sliding contact with the outer peripheral surface of the rack shaft 26. A seal member 40 is mounted on the side case 21L in sliding contact with the outer peripheral surface of the protective tube 38. These seal members 39, 40 seal the space A, at its lefthand end, in which the ball screw mechanism 43 is disposed. The seal member 39 interposed between the rack shaft 26 and the protective tube 38 has a greater sliding resistance than that of the seal member 40 interposed between the protective tube 38 and the side case 21L.

Dust boots 41L, 41R are disposed respectively around the lefthand and righthand ends of the rack shaft 26 and attached to corresponding ends of the gear casing 21. The lefthand dust boot 41L makes the space A additionally resistant to dust and protects the projecting end of the rack shaft 26. The righthand dust boot 41R protects the projecting end of the rack shaft 26 and defines a righthand portion of the space B.

Around the rack shaft 26 and the auxiliary tube 37 there is disposed an electric motor 42 within the central case 21a for generating assistive power. The ball screw mechanism 43 is disposed in the lefthand side case 21L adjacent to the motor 42 for transmitting power from the motor 42 to the rack shaft 26.

The motor 42 is disposed in the central shaft 21a coaxially with the rack shaft 26. The motor 42 has field magnets 44 fixed to an inner wall surface of the central case 21a and a cylindrical rotor 45 rotatably disposed between the field magnets 44 and the auxiliary tube 37. The rotor 45 has a tubular shaft 48 serving as an output shaft and rotatably supported by bearings 46, 47, the auxiliary tube 37 being inserted through the tubular shaft 48. The motor 42 includes a laminated iron core 49 disposed coaxially around the tubular shaft 48 and having a skewed groove, and multiplexed armature windings 50 disposed coaxially around the iron core 49. The armature windings 50 are electrically connected to the control unit 34 through a commutator 51 fixed to the tubular shaft 40 and a brush 53 disposed in a holder 52 and resiliently held against the commutator 51, so that rotation of the armature windings 50 can be controlled by the control unit 34.

The ball screw mechanism 43 comprises the rack shaft 26 with the helical groove 26b defined in its outer peripheral surface, a nut member 56 fitted over the rack shaft 26 and having a helical groove 56a defined in its inner peripheral surface in radial registry with the helical groove 26b, and a plurality of balls 57 rollingly riding in the helical grooves 26b, 56a. The nut member 56 is rotatably supported in the side case 21L by means of a pair of bearings 54, 55, and coupled to the tubular shaft 48 of the motor 42 for rotation therewith. When the motor 42 is energized, the nut member 56 of the ball screw mechanism 43 is rotated by the motor 42 to convert rotative power of the motor 42 to axial movement of the rack shaft 26.

The motor-operated power steering apparatus operates as follows:

Rotation of the motor 42 is controlled by the control unit 34 based on output signals from the steering torque sensor 31 and the steering rotation sensor 32. The assistive power generated by the motor 42 is converted by the ball screw mechanism 43 to axial movement which is transmitted to the rack shaft 26. Therefore, assistive power commensurate with the steering force manually applied to the steering wheel is imparted to the rack shaft 26, which is moved axially from the illustrated neutral position to the right or left for turning the wheels.

Figure 3:
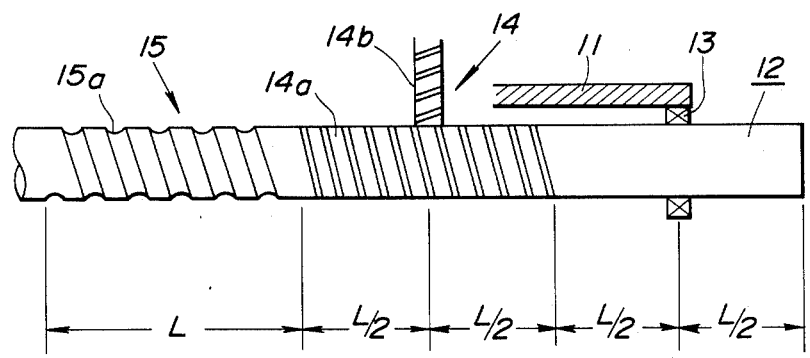
FIGS. 3 and 5 are schematic fragmentary views of a conventional motor-operated power steering apparatus with a rack and pinion mechanism.

The seal member 59 is also axially moved with the rack shaft 26 while sliding against the inner peripheral surface of the auxiliary tube 37, which isolates the spaces A, B from each other at all times. Therefore, it is not necessary to provide the rack shaft 26 with any portions which would slide against the seal member 59. Comparison between FIGS. 2 and 3 clearly shows that the rack shaft 26 may be shorter than a conventional rack shaft, allowing a considerable excess space to be created around the rack shaft 26.

The seal member 59 also serves to prevent lubricating oil from flowing out of the ball screw mechanism 43 in the space A and also to prevent lubricating oil from flowing from the meshing rack teeth 26a and pinion gear 27 in the space B. Accordingly, the ball screw mechanism 43 and the meshing rack teeth 26a and pinion gear 27 can be operated smoothly over a long period of time, and their durability is increased. Even if the dust boot 41R is broken or damaged, since the space A with the ball screw mechanism 43 therein which requires a high degree of dust and water resistance, is protected from the entry of dust and water by the seal member 59, the ball screw mechanism 43 is prevented from malfunctioning due to a dust deposit or the like, and remains highly reliable in operation.

Inasmuch as the seal member 59 is slidably held against the auxiliary tube 37 supported in the gear casing 21, forces applied to the seal member 59 act only in the axial direction of the rack shaft 26 upon movement thereof. The seal member 59 therefore has an increased degree of durability since rotative forces or forces other than axial forces would not be applied to the seal member 59.

While in the above embodiment the seal member 59 is held in sliding contact with the auxiliary tube 37, the auxiliary tube 37 may be dispensed with, and the seal member 59 may be directly held in sliding contact with the tubular shaft 48 of the rotor 45 of the motor 42.

Figure 4:
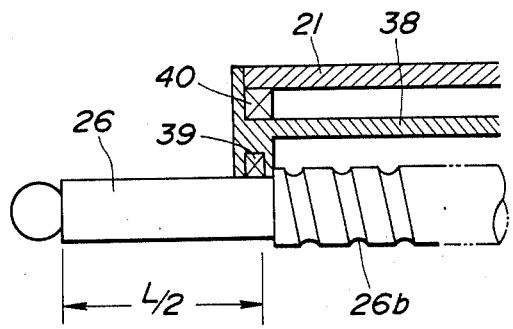
Figure 5:
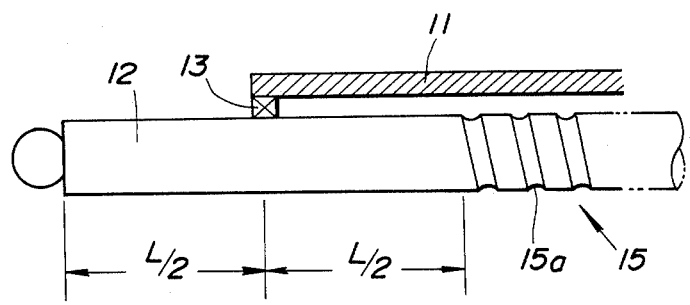

The protective tube 38 operates as follows: When the rack shaft 26 is moved to the left, for example, the protective tube 38 is also moved to the left with the rack shaft 26 and projects out of the side case 21L, thereby protecting the helical groove 26b of the rack shaft 26 which also projects out of the side case 21L. As can clearly be understood from a comparison of FIGS. 4 and 5, each of the gear casing 21 and the rack shaft 26 may be axially shortened by a length L/2, making it possible to provide a space around the gear casing 21. When the rack shaft 26 is moved to the right from this position, the protective tube 38 is slid against the side case 21L into the side case 21L since the seal member 39 has a greater sliding resistance than that of the seal member 40. The protective tube 38 is moved into the side case 21L until the stopper 38a abuts against the end of the side case 21L, whereupon the rack shaft 26 reaches the neutral position. When the rack shaft 26 is moved to the right from the illustrated neutral position, the protective tube 38 is not moved with the rack shaft 26, but the rack shaft 26 is slid against the protective tube 38. Therefore, the rack shaft 26 can smoothly slide axially in either direction. The helical groove 26b that should be protected against damage is not exposed out of the gear casing 21 no matter how the rack shaft 26 may be axially moved.

With the rack-and-pinion motor-operated power steering apparatus according to the present invention, the space in the gear casing in which the rack and pinion mechanism is disposed and the space in the gear casing in which the assistive-power transmitting mechanism is disposed are separated or isolated from each other by the auxiliary tube and the seal member. The space accommodating the assistive-power transmitting mechanism that requires a high degree of dust and water resistance is securely sealed against entry of dust, rain water, and other foreign matter from outside, so that the assistive power transmitting mechanism can continuously operate smoothly over a long period of time. Since the rack shaft is not required to have portions slidably held against the seal member, the rack shaft and the gear casing are shortened in the axial direction, and hence the power steering apparatus is reduced in size and weight. Moreover, an excess space is created around the shortened rack shaft to permit steering linkages to be designed with greater freedom or flexibility.

Although there has been described what is at present considered to be the preferred embodiment of the present invention, it will be understood that the invention may be embodied in other specific forms without departing from the spirit or essential characteristics thereof. The present embodiment is therefore to be considered in all aspects as illustrative, and not restrictive. The scope of the invention is indicated by the appended claims rather than by the foregoing description.

I claim:

1. A rack-and-pinion type motor-operated power steering apparatus, comprising:
 a pinion shaft having a pinion and adapted to be operatively coupled to a steering wheel;
 a rack shaft having a rack and adapted to be operatively coupled to wheels;
 a gear casing having first and second spaces therein, said pinion shaft being rotatably supported in said gear casing, said rack shaft being axially movably supported in said gear casing, said pinion and said rack being held in mesh with each other within said first space in said gear casing;
 an electric motor for generating assistive power;
 assistive-power transmitting means disposed in said second space around said rack shaft for converting rotative power of said electric motor to a force in an axial direction of said rack shaft and transmitting said force to said rack shaft; and
 partition means disposed between said first and second spaces and isolating them from each other.

2. A rack-and-pinion-type motor-operated power steering apparatus according to claim 1, wherein said partition means comprises a seal member extending radially outward from said rack shaft and situated between a portion of said rack shaft in which said assistive-power transmitting means is disposed and a portion of said rack shaft in which said rack is disposed, and movable axially with said rack shaft, and an auxiliary tube suported in said gear casing, with an inner surface of said auxilary tube held in sliding contact with said seal member, said auxiliary tube cooperating with said seal member in isolating said first and second spaces from each other.

3. A rack-and-pinion-type motor-operated power steering apparatus according to claim 2, wherein said auxiliary tube is disposed coaxially around said rack shaft with a small gap defined therebetween, said auxiliary tube having an inner peripheral surface slidably held against said seal member to seal said gap.

4. A rack-and-pinion-type motor-operated power steering apparatus according to claim 3, wherein said electric motor has a cylindrical rotor, said auxiliary tube having one end supported in said gear casing and the opposite end inserted into said rotor.

5. A rack-and-pinion-type motor-operated power steering apparatus according to claim 4, further including a seal member sealingly interposed between said one end of said auxiliary tube and said gear casing.

6. A rack-and-pinion-type motor-operated power steering apparatus according to claim 1, wherein said rack shaft has a helical groove defined in an outer peripheral surface thereof, said assistive-power transmitting means comprising said rack shaft having said helical groove, a nut member fitted over said rack shaft and rotatable in response to energization of said electric motor, said nut member having a helical groove defined in an inner peripheral surface thereof, and a plurality of balls rollingly riding in said helical groove of said rack shaft and said helical groove of said nut member.

7. A rack-and-pinion-type motor-operated power steering apparatus according to claim 1, wherein said electric motor is disposed in said gear casing coaxially with said rack shaft.

8. A rack-and-pinion-type motor-operated power steering apparatus according to claim 7, wherein said electric motor and said assistive-power transmitting means are disposed adjacent to each other along said rack shaft.

9. A rack-and-pinion-type motor-operated power steering apparatus according to claim 1, further including a boot extending between ends of said rack shaft and said gear casing for protecting the respective end of said rack shaft projecting from the end of said gear casing.

* * * * *

UNITED STATES PATENT AND TRADEMARK OFFICE
CERTIFICATE OF CORRECTION

PATENT NO. : 4,766,970

DATED : August 30, 1988

INVENTOR(S) : Yasuo Shimizu

It is certified that error appears in the above-identified patent and that said Letters Patent is hereby corrected as shown below:

Column 2, line 58, change "lines" to --tires--.

Signed and Sealed this

Twenty-sixth Day of December, 1989

Attest:

JEFFREY M. SAMUELS

Attesting Officer    Acting Commissioner of Patents and Trademarks